United States Patent Office 3,450,653
Patented June 17, 1969

3,450,653
POLYURETHANE ELASTOMERIC SEALANTS
Thomas R. McClellan, Madison, Conn., assignor to The Upjohn Company, Kalamazoo, Mich., a corporation of Delaware
No Drawing. Filed Dec. 10, 1965, Ser. No. 513,082
Int. Cl. C08g 22/06; C09k 3/10
U.S. Cl. 260—18
6 Claims

ABSTRACT OF THE DISCLOSURE

Polyurethane elastomeric sealants are prepared in a one-shot procedure, by reacting (i) a polymethylene polyphenyl isocyanate mixture containing from about 65% to about 75% by weight of methylenebis(phenyl isocyanates) the remainder of said mixture being polymethylene polyphenyl isocyanates of functionality greater than 2.0 (ii) a polyol having a hydroxyl number of 50 to 150 comprising a propylene oxide-aniline adduct (iii) optionally, an inert filler (clay is preferred) and (iv) a catalyst (organotin or lead compounds preferred). Sealants useful for sealing and caulking joints in ceramic pipe and the like, for covering floors, and all applications in which sealants of this type can be employed.

This invention relates to novel elastomeric polyurethanes and to processes for their preparation and is more particularly concerned with novel elastomeric polyurethanes suitable for use as sealants and with processes for their preparation.

The use of elastomeric polyurethane preparations as sealants is a recent development in the sealing art. Polyurethane elastomers which are useful for this purpose are characterized by a post-cure durometer hardness (as determined by ASTM D1706–61 durometer Type A Test) of the order of about 35 to about 80, by high tear strength, by their ability to adhere to substrates such as glass, cement, aluminum, steel, iron and like metals, and by their resistance to corrosion on exposure to the atmosphere, to attack by acid or alkaline media, and to attack by microorganisms such as those found in soil. Low cost of ingredients and finished formulation is another essential characteristic of this type of composition.

Sealant compositions based on polyurethane elastomers find a variety of uses, for example, as sealants for glass, in the automobile industry, for building purposes such as sealing of curtain wall buildings, and for the sealing of joints in cement highways, bridges, airport runways, dams, reservoirs, swimming pools and the like. In a particular application which will be discussed hereinafter the polyurethane elastomer sealants can be used for the covering of surfaces such as floors, walls and the like which are subject to heavy traffic patterns.

The methods generally employed in the art for the preparation of polyurethane sealants involve the reaction of a polyol, generally a polyether polyol, and polyisocyanate in the presence of a suitable catalyst, for example, various derivatives of tin.

Fillers, such as carbon black, mineral fillers, for example, clay and the like, resins and sythetic polymers such as polyvinyl chloride, are generally added to the reaction mixture employed to prepare the sealants. Such fillers have been found to improve the physical properties, particularly the hardness, tensile and tear strength of the resulting sealants. Other adjuvants such as pigments, antioxidants and the like can also be used as optional ingredients in said sealants. Typical of the prior art methods of preparing polyurethane sealants are Heiss, Rubber Age 88, 89, 1960; Damusis et al., Industrial and Engineering Chemistry, Product Research and Development 1, No. 4, 269–274, 1962; and U.S. Patent 3,201,136.

The isocyanate generally employed in these prior art methods for the preparation of polyurethane sealants has been toluene diisocyanate (TDI; the most commonly available form is an 80 to 20 mixture of 2,4- and 2,6-toluene diisocyanate) or an isocyanate terminated prepolymer obtained by reaction of an excess of this isocyanate with a glycol or triol such as trimethylolpropane.

We have now found that polyurethane sealants having significantly superior properties compared to those of the sealants hitherto described, can be obtained by employing as the isocyanate component in the preparation of said polyurethane, a mixture of polymethylene polyphenyl isocyanates having a particular composition. Said mixture of polyisocyanates is a mixture of polymethylene polyphenyl isocyanates containing from about 65% to about 75% by weight of methylenebis (phenyl isocyanates) the remainder of said mixture being polymethylene polyphenyl isocyanates of functionality greater than 2.0. Said polyisocyanate mixture is obtained by phosgenating the corresponding mixture of polyamines derived by condensation of aniline and formaldehyde in the presence of hydrochloric acid and containing from about 65% by weight to about 75% by weight of methylene dianilines the remainder of said mixture being triamines, tetramines, and polyamines of higher molecular weight.

Accordingly, the present invention in its broadest aspect comprises a process for the preparation of a polyurethane sealant by reaction of a polyol and a polyisocyanate in the presence of a catalyst characterized in that the polyisocyanate component is a mixture of polymethylene polyphenyl isocyanates containing from about 65% to about 75% by weight of methylenebis (phenyl isocyanate) the remainder of said mixture being polymethylene polyphenyl isocyanates of functionality greater than 2.0.

The polyisocyanates described above are prepared by conventional procedures the critical requirements necessary to produce the desired content of the methylenbis (phenyl isocyanate) being the molar proportion of aniline to formaldehyde employed in producing the mixture of polyamides from which the polyisocyanate mixture is prepared by phosgenation. Use of a molar proportion of aniline to formaldehyde of the order of about 4.0 to 1.75 gives a polyamine which on phosgenation yields the desired mixture of polymethylene polyphenyl isocyanates containing approximately 65% of methylenebis (phenyl isocyanate). The use of a molar ratio of aniline to formaldehyde of approximately 4:1.4 gives a polyamine which on phosgenation yields the corresponding mixture of polyisocyanates containing approximately 75% of methylenebis (phenyl isocyanate). In order to produce polyisocyanates with a methylenebis (phenyl cyanate) content intermediate between the above limits it is merely necessary to make the appropriate adjustment to the aniline to formaldehyde ratio used in preparing the intermediate polyamine.

Illustrative of the reaction conditions which can be employed in carrying out the preparation of the above polyisocyanate mixtures by condensation of aniline and formaldehyde in the presence of hydrochloric acid followed by phosgenation of the resulting polyamines are those described by D'Ancicco et al. Canadian Patent 700,026, and Abbotson et al. U.S. Patent 2,950,263.

A particularly preferred polyisocyanate for use in the process and the compositions of the invention is that which contains approximately 70% by weight of methylenebis (phenyl isocyanates) the remainder of said mixture being polyisocyanates of functionality higher than 2.0. A polyisocyanate of this specification is now available commercially under the name Carwinate 390–P.

The polyols which are employed in the process and compositions of the present invention can be any of those previously employed in the art in the preparation of polyurethane elastomer sealants. Preferably the polyol is one having an hydroxyl number within the range of about 50 to about 150. Said polyols can be either polyester polyols or polyether polyols the latter being preferred principally because of their relatively low cost.

Illustrative of the polyols which can be employed in the process and compositions of the present invention are naturally occurring polyols such as castor oil, tall oil, and the like; polyethers such as polyoxyalkylene glycols, for example, the polyoxyethylene glycols prepared by the addition of ethylene oxide to water, ethylene glycols or diethylene glycol; polyoxypropylene glycols prepared by the addition of 1,2-propylene oxide to water, propylene glycol or dipropylene glycol; mixed oxyethylene-oxypropylene polyglycols prepared in a similar manner utilizing a mixture of ethylene oxide and propylene oxide or a sequential addition of ethylene oxide and 1,2-propylene oxide; polyether glycols prepared by reacting ethylene glycol, propylene oxide or mixtures thereof with mono- and polynuclear dihydroxy benzenes, e.g., catechol, resorcinol, hydroquinone, orcinol, 2,2-bis(p-hydroxyphenyl)propane, bis(p-hydroxyphenyl)-methane, and the like; polyethers prepared by reacting ethylene oxide, propylene oxide, or mixtures thereof with aliphatic polyols such as glycerol, sorbitol, trimethylolpropane, 1,2,6-hexane-triol, pentaerythritol, sucrose or glycosides, e.g., methyl, ethyl, propyl, butyl, and 2-ethylhexyl, arabinoside, xyloside, fructoside, glucoside, rhamnoside, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran; or polyols containing an aromatic nucleus such as 2,2-bis(hydroxyphenyl)ethanol, pyrogallol, phloroglucinol, tri(hydroxyphenyl)alkanes, e.g., 1,1,3-tris(hydroxyphenyl)ethanes, and 1,1,3-tris(hydroxyphenyl)propanes, etc., tetrakis(hydroxyphenyl)-alkanes, e.g., 1,1,3,3-tetrakis(hydroxy-3-methylphenyl)propanes, 1,1,4,4-tetrakis(hydroxyphenyl)butanes, and the like.

A particularly useful polyol for employment in the process of the invention is a polyol mixture comprising a polyol adduct produced by mixing under hydroxyalkylation conditions from 2 to 20 molecular equivalents of ethylene oxide, propylene oxide, or 1,2-butylene oxide, or mixtures thereof, and one amine equivalent of an aromatic amine such as aniline, or a polyamine mixture, 100 parts of said polyamine mixture containing from 35 to 90 parts of methylene dianilines, the remaining parts being triamines and polyamines of higher molecular weight, said polyamine mixture having been formed by acid condensation of aniline and formaldehyde.

Illustrative of the polyester polyols which can be employed in the process of the invention are those prepared from dibasic carboxylic acids and polyhydric alcohols, preferably dihydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol component or components of the polyester are preferably dihydric. Examples of suitable diols are ethylene glycol, diethylene glycol, 1,2-propylene glycol, 1,4-butanediol and cyclohexanediol. A mixture of one or more diols with a minor proportion (generally less than about 10 percent by weight) of a triol such as trimethylolethane, trimethylolpropane, mannitol, and hexanetriol, can also be used as esterifying polyol.

Mixtures of two or more of the aforesaid polyether and polyester polyols can be employed, if desired. A mixture comprising at least one polyoxyalkylene glycol and at least one of the adducts of an alkylene oxide and an aromatic amine such as aniline or a polyamine mixture (the polyamine having been derived by acid condensation of aniline and formaldehyde) as described above, has been found to give polyurethane sealants of particularly useful properties when prepared in accordance with the process of this invention. A particularly preferred mixture of polyols is a mixture of at least one polyoxyalkylene glycol and a member selected from the class consisting of N,N-di(2-hydroxypropyl)aniline and the adduct of 3.5 moles of propylene oxide and 1 amine equivalent of aniline.

In preparing the polyurethane sealants in accordance with the invention the polyisocyanate component and the polyol are brought together in the presence of a catalyst in accordance with procedures conventional in the art. The catalyst which is employed is advantageously one which (a) is miscible with the reaction components and (b) catalyses the reaction of the polyisocyanate and the polyol in preference to the reaction of polyisocyanate with any water which might become incorporated in the reaction mixture by accident or unavoidable exposure to moist atmospheric conditions during the reaction. Ideally the catalyst so influences the rate of reaction between the isocyanate and polyol that the time for which the sealant remains workable (i.e. manually or by machine) after admixture of the components is of the order of about 1 to about 15 minutes.

Example of catalysts which meet the requirements above are: organo tin compounds, advantageously compounds of tetravalent tin including organo-tin oxides, organo tin hydroxides, organo tin carboxylates and organo tin alcoholates, illustrative of which types of compound are dibutyl tin diacetate, dibutyl tin di-2-ethylhexanoate, dibutyl tin oxide, dibutyl tin sulfide, tri butyl tin 2-ethylhexanoate, triphenyl tin hydroxide, bis-(tributyl tin)oxide, dibutyltin dilaurate, tributyltin acetate, and the like; metal salts of organic carboxylic acids, particularly the lead, bismuth, mercury, antimony and tin salts of fatty acids, illustrative of which salts are stannous 2-ethylhexanoate (commonly referred to as tin octoate), lead 2-ethylhexanoate, lead naphthenate, lead linoresinate, lead ricinoleate, mercury naphthenate, antimony naphthenate, stannous decanoate, stannous undecanoate, stannous octadecanoate and the like.

Preferred catalysts for use in the process of the invention are tin (stannous) salts of fatty acids and an especially preferred catalyst is stannous 2-ethylhexanoate.

If desired a combination of any of the above named metallic catalysts and a minor proportion of a tertiary amine can be employed as catalyst. Illustrative of the tertiary amines which can be employed for this purpose are triethylamine, triisobutylamine, N,N,N',N'-tetramethylethylene diamine, N,N,N',N'-tetramethyl-1, 3-propanediamine, N,N,N',N'-tetramethyl-1,3-butanediamine, N,N-dimethylcyclohexylamine, triethylenediamine, 1,2,4-trimethylpiperazine and the like. The use of these tertiary amine catalysts as the sole catalysts in the preparation of the polyurethane sealants of the invention gives generally unsatisfactory results because of unduly long cure times and a tendency to preferentially catalyse the polyisocyanate and water reaction thus causing bubbles to form in the resultant sealant. However, the use of these tertiary amine catalysts in combination with the above described metal catalysts is free from these disadvantages.

The concentration of catalyst employed in the reaction mixture in the process of the invention is advantageously of the order of about 0.5 to about 15 percent by weight based on polyisocyanate employed in the reaction mixture. Preferably the amount of catalyst employed is of the order of about 3 to about 6 percent by weight based on polyisocyanate.

The polyisocyanate and the polyol (either a single polyol or a mixture of two or more such polyols) are employed in the reaction mixture employed to prepare the sealants in such proportions that the overall ratio of NCO to OH groups is within the range of about 1.01:1.0 to 1.5:1.0 and is preferably within the range of about 1.05:1.0 to about 1.2:1.0.

The admixture of components of the reaction mixture can be carried out in any convenient manner immediately prior to the time at which the sealant is to be used. Thus, in the case of small batches of sealant the admixture can be carried out manually in a suitable vessel and the reaction mixture cast in a suitable mold or applied directly to the site to be sealed using suitable hand tools such as trowels, spatulas, and the like. For operation on a larger scale, mechanical mixers and the like are employed to prepare the sealant mixer. Application of the sealant to the site to be sealed can be effected using caulking guns and like pressure equipment conventional in the art.

Curing of the elastomeric sealants so prepared generally takes place at room temperature. Where the sealant is applied directly to the sealing of joints and the like in outdoor locations it is generally inconvenient or impossible to apply heat to the elastomer to assist in the curing of same. In the case of elastomeric sealants prepared as described above and cast into molds e.g., in the preparation of gaskets, floor tiles and the like, heat can be applied to the elastomer in the curing stage, if desired. Heating to a temperature within the range of about 60° C. to about 100° C. is generally satisfactory for this purpose in accordance with conventional methods for the curing of polyurethane elastomers.

It is frequently desirable, but not essential, to incorporate a filler material into the sealants prepared in accordance with this invention. The filler can be any of the fillers hitherto employed in the art for this purpose. Said fillers are preferably in finely divided form, i.e., have an average particle size which is advantageously less than about 50 microns and preferably less than about 100 microns, are inert in the sense that they do not enter into chemical reaction with any of the other components of the sealant reaction mixture, and are resistant to attack upon exposure to acids, alkalies, atmospheric conditions, soil microorganisms and the like. Examples of such fillers are the following: carbon black including the various grades of channel black, furnace black, and the like, polystyrene, polyvinyl chloride, gypsum, natural clays, including the various hard clays, kaolin, China clay and the like, natural silicas, asbestos, and the like.

Preferred fillers for use in the process and compositions of the invention are the natural clays particularly those which have been heat treated i.e., have been partially or fully calcined.

The filler can be incorporated into the elastomeric sealants of the invention either by adding said filler to the mixture of other reactants immediately prior to formation of the sealant or, preferably, by prior mixing of the filler with the polyol component of the reaction mixture. The amount of filler incorporated into the sealant varies according to the desired properties of the resulting sealant but is generally within the range of about 30 percent to about 50 percent based on final weight of the sealant. The upper limit of the amount of filler which can be incorporated into the elastomeric sealants of the invention is dictated for all practical purposes by the amount of said filler which can be admixed either manually or mechanically with the remaining components of the reaction mixture without rendering the resultant mixture unworkable.

Using an amount of filler within the above stated range produces a satisfactory increase in the load bearing characteristic of the resulting elastomer without adversely affecting the tensile strength and other properties thereof. Using amounts of filler above the stated upper limit tends to cause lessening of the tensile strength of the elastomer and is disadvantageous for uses in which this property is desirably good.

Preferably the amount of filler incorporated into the sealants of the invention is within the range of about 35 percent to about 45 percent based on final weight of the sealant.

In addition to the fillers discussed above the novel sealant composition can have other optional additives incorporated therein. Such optional additives include pigments such as titanium dioxide, coloring agents and the like which can be added largely for esthetic reasons, and antioxidants such as 2,6-di-tert-butyl-4-methylphenol, 4,4'-thiobis(6-tert-butyl-o-cresol) and the like.

The polyurethane elastomeric sealants produced in accordance with the process of the invention are characterized by their high resistance to cold flow (dimensional change under static load), by their uniform resiliency and flexibility over a wide range of atmospheric conditions, by their low compression set and by their resistance to deterioration upon exposure to a wide range of solvents, acids and alkalies.

The polyurethane elastomeric sealants of the invention are accordingly useful as sealants in the wide range of applications to which prior polyurethane elastomeric sealants have been submitted. In particular, the sealants of the present invention are useful as sealants in the joining of bell and spigot ceramic pipe sections such as used in the construction of sewers, and in the joining of pipe sections employed in the transfer of oil and the like fluids through pipelines. For these various purposes the sealants of the invention can be precast as gaskets in suitable moulds of the desired shape or can be cast and cured in place in the joint to be sealed. The sealants of the invention also find particular use as coverings for surfaces such as floors, loading docks, walls and the like which are exposed to heavy traffic patterns. For the latter purpose the sealants can be precast in the form of tiles which are then attached to the desired surface by means of suitable adhesives or can be cast or poured in place.

When the sealants of the invention are employed as joint sealants they can be applied to the joint to be sealed by conventional procedures using trowels, spatulas, caulking guns and the like, provided always that the time interval between mixing of the reactants to produce the sealant and completion of the application of the sealant to the joint is sufficiently short to avoid premature gelation.

For this purpose the components of the reaction mixture for preparation of the sealant are generally supplied in a two component package. One of the components is the polyisocyanate; the second component is a mixture of polyol, catalyst, filler (if used) and other adjuvants such as those described above. It is then merely necessary for the operator to mix the components either manually or mechanically and apply the resulting sealant to the desired site.

It is to be noted that it is preferable to ensure that the preparation and mixing of the various components of the sealant is carried out as far as possible under substantially anhydrous conditions in order to avoid undesirable side reactions, such as liberation of carbon dioxide and consequent bubbling of the reaction mixture, due to reaction of the polyisocyanate component with water.

The following examples describe the manner and process of making and using the invention and set forth the best mode contemplated by the inventor of carrying out the invention but are not to be construed as limiting.

EXAMPLE 1

A polyurethane elastomer was prepared from the following components.

Component A

This component was prepared by mechanical mixing of 30 parts by weight (0.059 equiv.) of P–1010 (a polyoxypropylene derivative of propylene glycol, molecular weight 1010), 10 parts by weight (0.0066 equiv.) of PPG–3025 (polypropylene glycol; average molecular weight 3025), 10 parts by weight (0.099 equiv.) of G–3030 (polyoxypropylene derivative of glycerol, average molecular weight 3030), 0.4 part by weight of stannous octoate (stannous 2-ethylhexanoate) and 45 parts by weight of Glomax-PVR (a calcined aluminum silicate clay, average particle size 2.5 microns).

Component B

This component consisted of a mixture of polymethylene polyphenyl isocyanates containing approximately 70 parts by weight of methylenebis (phenyl isocyanate) the remainder of said mixture being tri-, tetra-, and polyfunctional isocyanates, said mixture having been prepared by condensing aniline and formaldehyde in the molar proportion of 4.0 to 1.6 in the presence of about 2.3 equivalents of hydrochloric acid and phosgenating the mixture of polyamines so obtained. Said polyisocyanate had an equivalent weight of 130, a viscosity of 50 c.p.s. at 25° C., an average functionality of 2.2, and a specific gravity of 1.20 at 20° C.

In preparing the polyurethane sealant from the above components 11.5 parts by weight of component B and 95.4 parts by weight of component A are thoroughly mixed and cast in a metal mould (6" x 6" x ⅛"). The casting set approximately 4 minutes after initial mixing of the components to yield a rubbery material which was cured for 76 hours at approximately 25° C. The cured elastomer was found to have the following properties:

Hardness, Shore A (ASTM D676–59T) _____ 76
Tensile (ASTM D412–62T) (p.s.i.) _____ 750
Compression strength (ASTM D575–46) (p.s.i.):
    At 10% deflection _____ 180
    At 20% deflection _____ 350
    At 30% deflection _____ 590
    At 40% deflection _____ 890
    At 50% deflection _____ 1320
    At 60% deflection _____ 1600

The above sealant elastomer was found to be useful as a sealant, either poured in place or precast, for joining bell and spigot concrete pipe sections, and also for casting as a floor tile.

EXAMPLE 2

A polyurethane elastomer sealant was prepared from the following components:

Component A

This component was prepared by mechanical mixing of 37.2 parts by weight (0.037 equiv.) of P–2010 (a polyoxypropylene derivative of propylene glycol, average molecular weight 2010; 11.2 g. (0.075 equiv.) of an adduct obtained by reacting 1 equiv. of aniline and 3.5 equiv. of propylene oxide, 37.2 parts by weight of Glomax-PVR and 0.5 part by volume of stannous octoate.

Component B

This was identical to Component B as described in Example 1.

In preparing the polyurethane sealant from the above components, the whole of Component A and 14.5 parts by weight of Component B were thoroughly mixed and cast in a metal mould (6" x 6" x ⅛"). The resulting elastomer was cured for 30 minutes at 70° C. at the end of which time it was found to have the following properties:

Hardness Shore A (ASTM D676–59T) _____ 76
Tensile (ASTM D412–62T) (p.s.i.) _____ 1358
Ultimate elongation (ASTM D412–62T) (percent) 230
Die C tear (ASTM D624–54) (p.l.i.) _____ 177
Compression strength at 10% deflection (ASTM D575–46) (p.s.i.) _____ 155
Compression set—method B (ASTM D395–61) (percent) _____ 3–5

EXAMPLE 3

A polyurethane elastomer sealant was prepared from the following components:

Component A

This component was prepared by mechanical mixing of 37.2 parts by weight (0.037 equiv.) of P–2010, 7.88 g. (0.075 equiv.) of N,N-di-(2-hydroxypropyl)aniline, 37.2 parts by weight of Glomax-PVR and 0.5 part by volume of stannous octoate.

Component B

This was identical to Component B as described in Example 1.

In preparing the polyurethane sealant from the above components, the whole of Component A and 14.5 parts by weight of Component B were thoroughly mixed and cast in a metal mould (6" x 6" x ⅛"). The resulting elastomer was cured for 30 minutes at 70° C. at the end of which time it was found to have the following properties:

Hardness, Shore A _____ 78–80
Tensile (p.s.i.) _____ 1502
Ultimate elongation (percent) _____ 188
Die C tear (p.l.i.) _____ 193
Compression strength at 10% deflection (p.s.i.) 195
Compression set—method B (percent) _____ 7.7

(All the above tests carried out by the methods identified in Examples 1 and 2.)

EXAMPLE 4

A polyurethane elastomer sealant was prepared by mechanical mixing of 40 parts by weight (0.04 equiv.) of P–2010, 13.5 parts by weight (0.0093 equiv.) of PPG–3025, 40 parts by weight of Glomax-PVR, 1 g. Octasol-lead (containing 24% by weight of lead octoate) and 6.3 parts by weight (0.048 equiv.) of the polyisocyanate employed as Component B in Example 1. The mixing was accomplished in a total of 60 seconds, the polyisocyanate being added last. The mixture was cast in a mould (6" x 6" x ⅛") and the resulting elastomer was cured for 30 minutes at 70° C. The cured product was found to be useful as a pipe sealant and had the following physical properties:

Hardness, Shore A _____ 57
Tensile (p.s.i.) _____ 540
Ultimate elongation (percent) _____ 220
Die C tear (p.l.i.) _____ 92
Compressive strength at 10% deflection (p.s.i.) ____ 95

(All the above tests carried out by the methods identified in Examples 1 and 2.)

EXAMPLE 5

Two sealant compositions for use in the manufacture of floor tiles were prepared as follows:

D–5R.—A mixture of 37.1 parts by weight of P–2010, 11.3 parts by weight of an adduct obtained by reacting 1 equiv. of aniline and 3.5 equiv. of propylene oxide, 37.1 parts by weight of Glomax PVR and 0.037 part by weight of T–9 (stannous octoate catalyst) was prepared using a mechanical blender. To this mixture was added with vigorous stirring 14.5 parts by weight of the isocyanate employed as Component B in Example 1. The resulting mixture was cast in a mould (6" x 6" x ⅛") and was cured in the mould for 76 hours at approximately 25° C. The cured elastomer so obtained was found to have the properties shown in Table I below.

D–6.—A mixture of 37.5 parts by weight of P–2010, 7.8 parts by weight of N,N-di(2-hydroxypropyl)aniline, 40 parts by weight of Glomax PVR, and 0.075 parts by weight of T–9 was prepared using a mechanical blender. To this mixture was added with vigorous stirring 14.63 parts by weight of the isocyanate employed as Compound B in Example 1. The resulting mixture was cast in a mould (6" x 6" x 1/8") and was cured in the mould for 76 hours at approximately 25° C. The cured elastomer so obtained was found to have the properties shown in Table I below.

TABLE I

| | D-5R | D-6 |
|---|---|---|
| Hardness, Shore A | 76 | 78 |
| Tensile (p.s.i.) | 1,358 | 1,502 |
| Ultimate elongation (percent) | 230 | 188 |
| Die C tear (p.l.i.) | 177 | 193 |
| Compressive strength at 10% deflection (p.s.i.) | 155 | 200 |
| Compression set (method B) (percent) | 3-5 | 7-8 |

(All the above tests were carried out by the methods identified in Examples 1 and 2.)

Samples of the above two tile sealant compositions were subjected to tests designed to measure their behavior on prolonged exposure to solvents. Circular discs of material were cut, weighed and the volumes thereof calculated using a plenometer to determine surface area and a micrometer to measure average thickness. Each sample was then immersed in solvent (see Table II below) for one week at a temperature of approximately 25° C. At the end of this period the samples were removed from the solvent bath and the excess solvent removed by wiping with filter paper. The weight and volume of each treated sample was again measured.

The results (expressed in terms of percentage increase in weight and volume) are recorded in Table II below.

The results show that, even under the extremely severe conditions of the test procedure, the floor tile compositions D-5R and D-6 show remarkable resistance to attack by a wide variety of solvents. Each of the samples was allowed to stand in air to allow evaporation of solvent and the final samples so obtained showed no cracking or other signs of deterioration.

TABLE II

| | D-5R | | D-6 | |
|---|---|---|---|---|
| | Percent volume change | Percent wt. change | Percent volume change | Percent wt. change |
| Acetone | +71.7 | +35.8 | +46.0 | +28.9 |
| Methyl ethyl ketone | +92.0 | +45.0 | +75.3 | +41.0 |
| Methylene chloride | +77.0 | +63.9 | +75.3 | +51.3 |
| Ethyl acetate | +91.8 | +50.0 | +80.2 | +42.0 |
| n-Butanol | +73.0 | +37.6 | +69.1 | +36.4 |
| Oil (vacuum pump grade) | +8.5 | 0.0 | +3.7 | 0.0 |
| 10% hydrochloric acid | +10.4 | +4.4 | +12.0 | +3.9 |
| 10% sodium hydroxide solution | +2.3 | +0.5 | +4.8 | +2.5 |
| Cooking oil | +8.9 | +0.5 | +9.9 | +1.0 |
| Gasoline (regular) | +43.3 | +22.5 | +39.2 | +19.7 |

I claim:

1. A polyurethane elastomeric sealant composition comprising the product obtained by reacting, in the presence of a catalyst, (a) a polyol having a hydroxyl number within the range of about 50 to about 150 which polyol is a mixture of (i) a member selected from the class consisting of N,N-di(2-hydroxypropyl)aniline and the adduct of 3.5 moles of propylene oxide and one amine equivalent of aniline, and (ii) a polyether polyol having a hydroxyl number in the above range, and (b) a polyisocyanate which is a mixture of polymethylene polyphenyl isocyanates containing from about 65 percent to about 75 percent by weight of methylenebis(phenyl isocyanate) the remainder of said mixture being polymethylene polyphenyl isocyanates having a functionality higher than 2.0.

2. A polyurethane elastomeric sealant composition comprising the product obtained by reacting, in the presence of a catalyst and an inert filler in finely divided form, (a) a polyol having a hydroxyl number within the range of about 50 to 150 which polyol is a mixture of (i) a member selected from the class consisting of N,N-di(2-hydroxypropyl)aniline and the adduct of 3.5 moles of propylene oxide and one amine equivalent of aniline, and (ii) a polyether polyol having a hydroxyl number in the above range, and (b) a polyisocyanate which is a mixture of polymethylene polyphenyl isocyanates containing from about 65 percent to about 75 percent by weight of methylenebis(phenyl isocyanate) the remainder of said mixture being polymethylene polyphenyl isocyanates of functionality higher than 2.0.

3. A polyurethane elastomeric sealant composition comprising the product obtained by reacting, in the presence of a catalyst and a natural clay in finely divided form, (a) a polyol having a hydroxyl number from about 50 to 150 which polyol is a mixture of (i) a member selected from the class consisting of N,N-di(2-hydroxypropyl) aniline and the adduct of 3.5 moles of propylene oxide and one amine equivalent of aniline, and (ii) a polyether polyol having a hydroxyl number in the above range, and (b) a polyisocyanate which is a mixture of polymethylene polyphenyl isocyanates containing from about 65 percent to about 75 percent by weight of methylenebis(phenyl isocyanate) the remainder of said mixture being polymethylene polyphenyl isocyanates of functionality higher than 2.0.

4. The composition of claim 3 wherein the polyol comprises a polyoxyalkylene glycol and N,N-di(2-hydroxypropyl)aniline.

5. The composition of claim 3 wherein the polyol comprises a polyoxyalkylene glycol and the adduct of propylene oxide and aniline obtained by reacting 1 amine equivalent of aniline with 3.5 equivalents of propylene oxide.

6. The composition of claim 3 wherein the catalyst is stannous 2-ethylhexoate.

References Cited

UNITED STATES PATENTS

| 3,394,165 | 7/1968 | McClellan et al. | 260—77.5 X |
| 3,391,101 | 7/1968 | Kelly et al. | |
| 3,378,497 | 4/1968 | Lanham | 260—77.5 X |
| 3,264,268 | 8/1966 | Muller et al. | 260—75 X |
| 3,294,713 | 12/1966 | Hudson et al. | |
| 3,277,173 | 10/1966 | Powers et al. | |
| 3,245,924 | 4/1966 | Cox et al. | |
| 3,201,136 | 8/1965 | Harrison et al. | |

FOREIGN PATENTS

| 1,038,266 | 8/1966 | Great Britain. |
| 660,652 | 9/1965 | Belgium. |

DONALD E. CZAJA, Primary Examiner.

C. WARREN IVY, Assistant Examiner.

U.S. Cl. X.R.

260—9, 37, 45.95, 47, 75, 77.5